3,309,495
APPARATUS FOR WELDING SMALL STUDS
Thomas E. Shoup, Amherst, and Steve Spisak, Elyria, Ohio, assignors to Gregory Industries, Inc., Lorain, Ohio, a corporation of Michigan
Filed Nov. 18, 1964, Ser. No. 412,015
9 Claims. (Cl. 219—98)

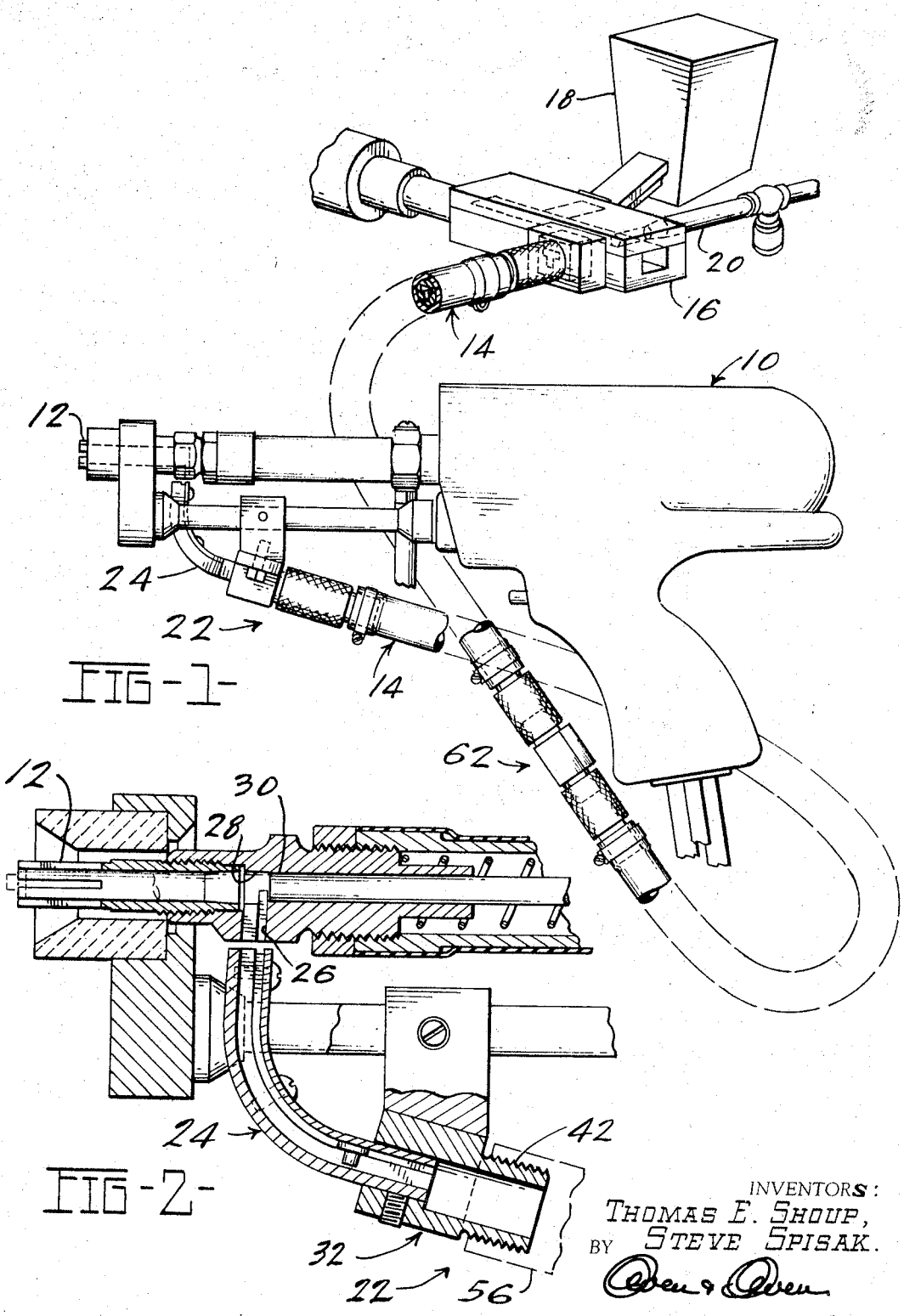

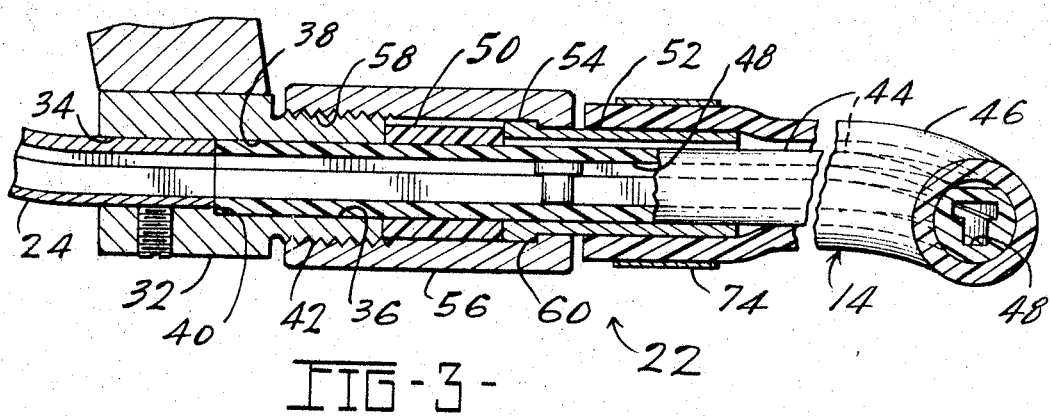
FIG-3-
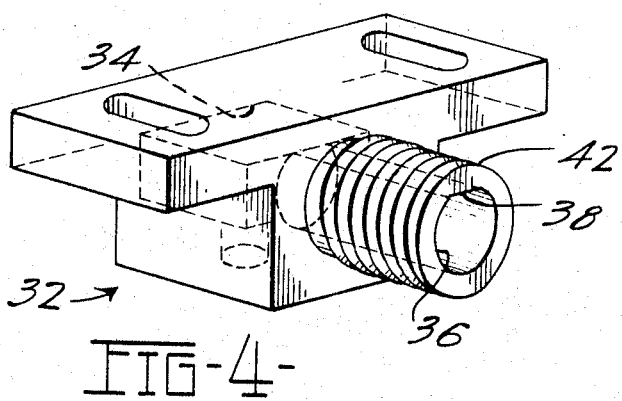
FIG-4-
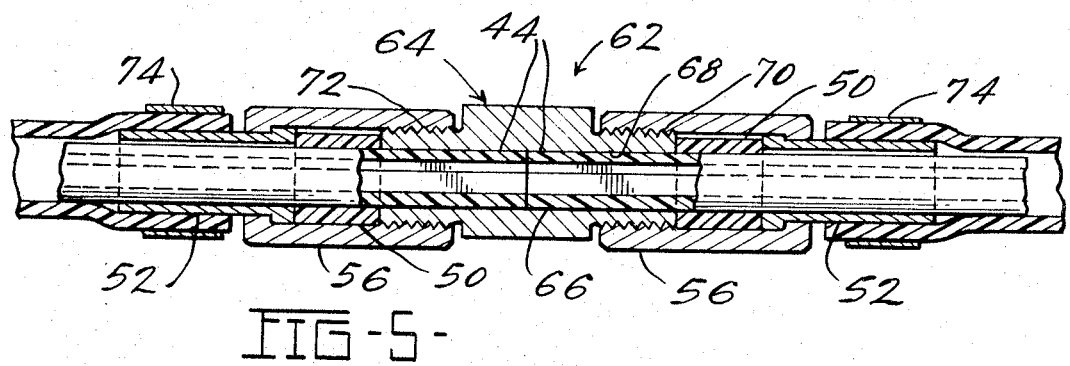
FIG-5-
INVENTORS:
THOMAS E. SHOUP,
BY  STEVE SPISAK.
Owen & Owen
ATT'YS.

This invention relates to a tube connection and more particularly to a connection for connecting a conveying or supply tube having a passage of predetermined shape to a body which receives articles from the tube.

The present invention is specifically concerned with a connection for a supply tube through which studs are fed to a stud welding tool, with the studs being conveyed sequentially down the tube to the tool after each preceding stud has been welded to a workpiece. The conveying or supply tube has a stud passage which is of a shape in transverse cross section similar to that of the stud in elevation, with the studs thus conveyed sideways down the tube. The tube also must be flexible to enable the welding tool to be portable relative to the stud supply. These factors have made extremely difficult the problem of connecting the tube to the welding tool and to the source of supply. The tube must be connected securely and yet in a manner such that the passage in the tube is not distorted or constricted by the connection. In addition, it has been found that the tube tends to wear more rapidly at the connection than elsewhere on its length. Consequently, it is desirable to have a connection which can be easily removed and attached farther along the tube when an end portion has worn. It is also desirable that the connection be effected without requiring too much time or special tools. A guard tube often is used around the supply tube and a connection also must be provided for it.

The present invention provides a connection for a supply tube of the above-discussed type which has the advantages and meets the requirements outlined above. The connection according to the invention further provides a coupling for an external guard tube when used.

It is, therefore, a principal object of the invention to provide a connection for a deformable supply tube having a shaped supply passage therein, which connection enables the tube to be connected in abutting relationship to a body without distorting the supply tube.

Another object of the invention is to provide a connection for a supply tube, which connection can be detached and replaced farther along the tube when the first part of the tube is worn.

Still another object of the invention is to provide a connection for a supply tube and a guard tube maintained therearound in generally concentric relationship.

Further objects and advantages of the invention will be apparent from the following detailed description of a preferred embodiment thereof, reference being made to the accompanying drawing, in which:

FIG. 1 is a somewhat schematic view, partly in perspective and partly in elevation, of a stud welding tool and loading means embodying the invention;

FIG. 2 is an enlarged, fragmentary view in vertical cross section of a portion of the welding tool and the loading means of FIG. 1;

FIG. 3 is a greatly enlarged view in vertical cross section of a tube connection for the loading apparatus;

FIG. 4 is a view in perspective of a part of the connection shown in FIG. 3; and FIG. 5 is a view in longitudinal cross section of a modified coupling embodying the invention.

Referring to the drawings and particularly to FIG. 1, a stud welding tool 10 is used to end weld a stud to a workpiece in a well known manner. The studs are fed to a chuck 12 of the tool from a conveying or supply tube assembly 14 connected to an escapement mechanism 16. Studs are fed from a hopper 18 to the escapement mechanism 16 from which they are blown by air from a nozzle 20 through the tube 14 and to the chuck 12. In this position, the studs are welded to a workpiece by means of the tool 10.

Referring more particularly to FIG. 2, the studs from the tube assembly 14 are supplied through a connection 22 and through a rigid guide member 24 to an inlet 26 for a loading chamber 28. The connection at the opposite end of the tube assembly 14 can be similar to the connection 22. The chuck 12 is aligned with the loading chamber 28 and receives a stud therefrom when moved forwardly by a pneumatically-operated piston 30. This apparatus is discussed more fully in a co-pending application of Steve Spisak, Ser. No. 358,736 filed Apr. 10, 1964, and entitled, "Stud Welding Tool and Stud Loading Device Therefor."

Referring to FIGS. 2 and 3, the guide member 24 extends into and is affixed to a stud-receiving body 32 which constitutes part of the connection 22. The body 32 includes a rectangular recess 34 which receives the guide member 24 and also includes a non-circular tube passage 36 for receiving a portion of the conveyor tube assembly 14, the passage 36 having a flattened side 38 to enable part of the tube assembly to be oriented therewith. The body 32 also has a shoulder 40 between the tube passage 36 and the guide member recess 34 to limit movement of a component of the tube assembly into the body 32. In addition, the body 32 has a threaded extension 42 aligned with the passage 36.

The tube assembly 14 includes an inner conveying tube 44 and an outer protective or guard tube 46. The conveying tube 44 has a non-circular outer surface similar to the configuration of the passage 36 so as to be oriented by virtue of the non-circular or flattened portion 38. Further, the tube 44 has an inner passage 48 which has a transverse cross section similar to the shape of the stud in elevation. With this arrangement, the stud is fed sideways down the tube 44 from the escapement mechanism 16 and has less chance of becoming jammed in the tube than if the stud is blown down the tube endways.

The tube 44 and the tube 46 are flexible and deformable in order that the tool 10 can be moved around relative to the escapement 16 and the hopper 18. Further, the passage 48 is only slightly larger than the studs, the passage must be carefully held to shape to prevent squeezing and jamming of the studs therein. These two factors have rendered it difficult to securely connect the tubes 44 and 46 to the stud-receiving body 32 without deforming the passage in any way.

These problems have now been overcome by means of the connection 22. Accordingly, the tube 44 is provided with a plastic ring 50 or other suitable enlargement which is cemented or otherwise adhered or affixed to the tube 44 at a point spaced from the end thereof. The spacing is such that when the end of the tube 44 abuts the shoulder 40 of the body 32, the ring is spaced slightly, a fraction of an inch, from the end of the threaded extension 42. Immediately to the rear of the ring 50 is a metal sleeve 52 having an annular shoulder 54 adjacent the ring 50. The sleeve 52 is slightly larger in diameter than the inner conveying tube 44 with the shoulder 54 having a diameter substantially equal to that of the plastic ring 50. A knurled adapter nut 56 constitutes means for placing one axial force on the ring 50 and is received around the sleeve 52 and the ring 50, having a threaded portion 58 at one end and an annular flange or shoulder 60 extending inwardly at the opposite end. The threaded portion 58 is turned onto the threaded extension 42 and the flange 60 is effective to cooperate with the sleeve shoulder 54 and the ring 50 to urge them toward the threaded extension 42. In this manner, the end of the tube 44 is pushed snugly against the shoulder 40 of the body 32 by virtue of the small gap normally existing between the plastic ring 50 and the extension 42 before the nut 56 is tightened fully. A secure connection is thereby provided between the conveying tube 44 and the stud-receiving body 32 without deforming at all the stud passage 48. The only force applied to the tube 44 is the slight lengthwise compressive force at the end of the tube 44 when the adapter nut 56 is tightened.

The connection 22 has a further advantage in that it can be placed farther along the tube assembly 14 whenever desired. It has been found that with the tube 44, wear occurs particularly at portions of the tube located at the connections, apparently because the tube at such points cannot yield to any extent when a stud passes therethrough, as is true of the unrestricted portions. Consequently, the tube at such points must be replaced more frequently than otherwise. This can be accomplished easily with the new tube connection 22 without replacing the entire tube. When wear occurs at the connection, the tube 44 is simply severed at a point beyond the worn portion. The plastic ring 50, or a new plastic ring, is then cemented in the appropriate place on the tube 44 with the sleeve 52 and the nut 56 assembled as before. This can be accomplished relatively quickly and without the use of any special tools.

The guard tube 46 has been found to be important in the overall conveying tube assembly 14, particularly when used in production plants where the apparatus is subjected to relatively hard use. The tube 46 prevents the conveying tube 44 from being easily cut or broken or otherwise damaged beyond use. However, the guard tube 46 has presented a further problem in the achievement of a connection for the tube assembly. It has been found that the sleeve 52 provides a ready connection for the protective tube 46 which is assembled simply by pushing the tube over the end of the sleeve. The shoulder 54 of the sleeve also constitutes a bearing member between the plastic ring 50 and the nut flange 60 to prevent the flange from otherwise binding on or tearing the ring 50, which might otherwise occur if the flange and ring were in direct contact with one another.

At times, it has been found to be advantageous to provide a connection at an intermediate point, generally in a middle portion, of the conveying tube assembly 14. For this purpose, a slightly modified tube connection 62 is used, being shown in longitudinal cross section in FIG. 5. The connection 62 includes a connecting or stud-receiving body 64 which is somewhat similar to the body 32, having a tube passage 66 with a flattened portion 68 enabling orientation of the tube 44. In this instance, the body 64 has two threaded extensions 70 and 72 which are aligned with one another and with the passage 66. The abutting ends of the tubes 44 take the place of the shoulder 40 of the body 32.

The tubes 44 and 46 of FIG. 5 are provided with the identical fittings to those of FIG. 3 and require no detailed discussion. The tube fittings include the plastic rings 50, the sleeves 52, and the nuts 56 connected to the threaded extensions 70 and 72. When the nuts 56 are threaded on the extensions 70 and 72, the ends of the tubes 44 are pressed together to place end portions of the tube in slight compression.

If desired, suitable clamping bands 74 can be placed at the ends of the guard tubes 46, around the sleeves 52.

When the stud is circular in transverse cross section and is fed endwise down the tube 44, the passage 48 can be circular. In the event the passage 48 is circular, the outer surface of the tube can be circular without any orienting means. This is also true of the tube passage 36.

Various modifications of the above described embodiments of the invention will be apparent to those skilled in the art, and it is to be understood that such modifications can be made without departing from the scope of the invention, if they are within the spirit and scope of the accompanying claims.

We claim:

1. In combination with a stud welding tool having a chuck, a loading chamber, an inlet for said loading chamber, a passage member aligned with said inlet, means for moving a stud from the loading chamber to the chuck, a conveying tube assembly for feeding a stud to said passage member comprising a flexible, deformable supply tube having a passage therethrough with a transverse shape similar to the shape of the studs in elevation, and a guard tube surrounding said supply tube, a tube connection for connecting said tube assembly to said passage member comprising a stud-receiving body having means for making a connection with said passage member, having a threaded extension extending opposite to said passage member, and having a passage extending through said extension and aligned with said passage member, said supply tube being received in said body passage in oriented relationship with respect to said passage member, said extension having a square end lying in a plane perpendicular to the axis of said body passage, a ring affixed to said supply tube at a position spaced from the end in said body passage, said ring having opposed square ends lying in planes perpendicular to the axis of said supply tube, a sleeve slidably mounted on said supply tube on the side of said ring opposite said tube end, said sleeve having an annular shoulder adjacent said ring, said shoulder having a flat face lying in a plane perpendicular to the axis of said supply tube, a nut having a threaded portion to be turned onto said threaded extension of said body and having an inwardly extending flange cooperating with said shoulder of said sleeve, said sleeve extending beyond said nut in a direction opposite to said threaded portion, said nut urging said supply tube and said ring toward said body only in a direction parallel to the axis of said supply tube when said nut is turned onto said threaded extension, and said guard tube being affixed to said sleeve around said supply tube.

2. In combination with a stud welding tool having a chuck, a loading chamber, an inlet for said loading chamber, a passage member aligned with said inlet, means for moving a stud from the loading chamber to the chuck, a flexible, deformable supply tube having a passage therethrough with a transverse shape similar to the shape of the studs, a tube connection for connecting said tube to said passage member comprising a stud-receiving body connected to said passage member, said body having tube-connecting means extending in the opposite direction to said passage member, and having a passage communicating with the passage of said passage member, said body passage receiving said supply tube in oriented relationship with respect to said passage member, a ring affixed to said supply tube at a position spaced from the end in said body passage, said ring having a square end opposite said passage member which lies in a plane perpendicular to the axis of said supply tube, a sleeve slidably mounted on said supply tube on the side of said ring opposite said tube, said sleeve having an annular shoulder adjacent said ring, said shoulder having a flat face lying in a plane perpendicular to the axis of said supply tube, a tube connection to be connected to said tube-connecting means of said body and having an inwardly extending flange cooperating with said shoulder of said sleeve, said sleeve extending beyond said connection in a direction opposite to said body, said connection urging said tube and said ring toward said body in a direction only parallel to the axis of said body passage when connected with said body.

3. In combination, a tube assembly comprising a stud supply tube having a passage of cross-sectional shape similar to the shape of a stud to be conveyed, and a guard tube surrounding said supply tube, a connection for connecting said tube assembly to a loading component of a stud welding tool, said connection comprising a stud-receiving body having means to receive said component, having a threaded extension opposite said receiving means, and having a non-circular passage through said extension and aligned with said receiving means, said body passage having a shape similar to the outer shape of said supply tube to receive said supply tube in oriented relationship with respect to said member, said body having stop means at the end of said body passage to receive said supply tube, a ring affixed to said supply tube at a point spaced from one end thereof so that when the one end lightly abuts said stop means, said ring is adjacent the end of said threaded extension, a sleeve slidably mounted on said supply tube and having an annular shoulder adjacent said ring, a nut having a threaded portion to be threadedly engaged with said threaded extension and having an inwardly extending flange around said sleeve and cooperating with said sleeve shoulder to urge said supply tube only against said stop means without squeezing said supply tube when said nut is turned on said extension, said sleeve extending outwardly beyond said nut and frictionally receiving said guard tube.

4. In combination, a tube assembly comprising a stud supply tube having a passage of cross-sectional shape similar to the shape of a stud to be conveyed, a connection for connecting said tube assembly to a loading component of a stud welding tool, said connection comprising a stud-receiving body having means to receive said component, having a threaded extension opposite said receiving means, and having a non-circular passage through said extension and aligned with said receiving means, said body passage having a shape similar to the outer shape of said supply tube to receive said supply tube in oriented relationship with respect to said member, said body having stop means at the end of said body passage to receive said supply tube, a ring affixed to said supply tube at a point spaced a predetermined distance from one end thereof, a sleeve slidably mounted on said supply tube and having an annular shoulder adjacent said ring, a nut having a threaded portion to be threadedly engaged with said threaded extension and having an inwardly extending flange around said sleeve and cooperating with said sleeve shoulder to urge said supply tube only against said stop means without squeezing said supply tube when said nut is turned on said extension.

5. A tube assembly comprising a stud supply tube having a passage of predetermined cross-sectional shape and a periphery of non-circular shape, and a guard tube surrounding said supply tube, a stud-receiving body having a non-circular passage for receiving said supply tube in oriented relationship, said body passage having a shape similar to the shape of said supply tube, said body having stop means in said body passage which an end of said supply tube contacts, said supply tube having an enlargement at a point spaced a predetermined distance from said end thereof, said enlargement having a square end lying in a plane perpendicular to the axis of said supply tube, a sleeve slidably mounted on said supply tube and having shoulder means adjacent said enlargement, said shoulder means having a plane abutting said enlargement which is parallel with said end of said enlargement whereby pressure of said sleeve against said enlargement is applied only in a direction parallel to said supply tube, a member co-operating with said shoulder means and attachable to said stud-receiving body to produce an axial force on said enlargement and on a portion of said supply tube when said member is attached to said body, said sleeve extending outwardly beyond said member and frictionally receiving said guard tube.

6. A tube assembly comprising a stud supply tube having a passage of predetermined cross-sectional shape and a guard tube surrounding said supply tube, a stud-receiving body having a passage receiving said supply tube, said supply tube having an enlargement affixed thereto at a point spaced a predetermined distance from one end thereof, said enlargement having a square end lying in a plane perpendicular to the axis of said supply tube, a member cooperating with said enlargement and attachable to said stud-receiving body to produce an axial force on said square end of said enlargement and on a portion of said supply tube without squeezing said tube when said member is attached to said body.

7. In combination with a stud welding tool having a chuck, a loading chamber, an inlet for said loading chamber, means for moving a stud from the loading chamber to the chuck, a two-part conveying tube assembly for feeding a stud to said inlet and comprising flexible, deformable supply tubes having passages therethrough with transverse shapes similar to the shape of the studs in elevation and guard tubes surrounding said supply tubes, a tube connection for connecting together the parts of said tube assembly, said tube connection comprising a connecting body having two threaded extensions extending in opposite directions and aligned with one another, said body having a passage extending therethrough and through both extensions and aligned with said extensions, ends of said supply tubes being received in said body passage in oriented relationship with one another, rings affixed to said supply tubes at positions spaced from the ends thereof, sleeves slidably mounted on said supply tubes on the sides of said rings opposite said connecting body, said sleeves having annular shoulders adjacent said rings, nuts having threaded portions to be turned onto said threaded extensions of said body and having inwardly extending flanges cooperating with the shoulders of said sleeves, said sleeves extending beyond said nuts in directions opposite to said connecting body, said nuts urging each of said supply tubes and said rings toward the opposite tube in an axial direction only when turned onto said threaded extensions, and said guard tubes being affixed to said sleeves around said supply tubes.

8. In combination with a stud welding tool having a chuck and a loading chamber for said chuck, a two-part conveying tube assembly for feeding a stud to said loading chamber and comprising flexible, deformable supply tubes having passages therethrough with shapes similar to the shape of the studs a tube connection for connecting together said tubes, said tube connection comprising a connecting body having threaded extensions extending in opposite directions and aligned with one another, said body having a passage extending through said body and through said extensions, ends of said supply tubes being received in said body passage in alignment with one another, rings affixed to said supply tubes at positions spaced from the ends thereof, nuts having threaded portions to be turned onto said threaded extensions of said body and having inwardly extending flanges, means cooperating between said nuts and said rings urging said supply tubes and said rings toward the opposite tube in an axial direction only when said nuts are turned onto said threaded extensions.

9. In combination with a stud welding tool having a chuck, a loading chamber, an inlet for said loading chamber, a passage member aligned with said inlet, means for moving a stud from the loading chamber to the chuck, a flexible, deformable supply tube having a passage therethrough, a tube connection for connecting said tube to said passage member comprising a stud-receiving body having means for making a connection with said passage member, having a threaded extension extending opposite to said passage member, and having a passage extending through said extension and communcating with said passage member, said supply tube being received in said body passage, a ring affixed to said supply tube at a position spaced from the end in said body passage, a sleeve slidably mounted on said supply tube on the side of said ring opposite said tube end, said sleeve having an annular shoulder adjacent said ring, a nut having a threaded portion to be turned onto said threaded extension of said body and having an inwardly extending flange cooperating with said shoulder of said sleeve, said nut urging said supply tube and said ring toward said body in an axial direction only when turned onto said threaded extension.

References Cited by the Examiner

UNITED STATES PATENTS

| | | | |
|---|---|---|---|
| 2,226,039 | 12/1940 | Wiltse | 285—55 X |
| 2,537,989 | 1/1951 | Grahm | 219—78 |
| 2,547,983 | 4/1951 | Slattery | 285—423 X |
| 2,653,040 | 9/1953 | Galluppi | 285—423 X |
| 2,905,803 | 9/1959 | Brady | 219—79 |

RICHARD M. WOOD, *Primary Examiner.*

R. F. STAUBLY, *Assistant Examiner.*